UNITED STATES PATENT OFFICE 2,483,753

COPOLYMER COMPOSITION

Thomas S. Carswell, Seattle, Wash., and Ralph F. Hayes, Springfield, Mass., assignors to Monsanto Chemical Company, St. Louis, Mo., a corporation of Delaware No Drawing. Application January 19, 1945, Serial No. 573,630

3 Claims. (Cl. 260—87.5)

This invention relates to copolymers of styrene and chlorinated styrenes.

Polystyrene is a highly valuable material for many purposes. However, for certain applications it is desirable to provide similar material having a lower degree of inflammability.

It is an object of this invention to provide styrene copolymers having a low degree of inflammability. A particular object of this invention is to provide copolymers of styrene with ring-chlorinated styrenes which are readily molded and have a low degree of inflammability.

These and other objects are accomplished by providing copolymers of styrene and polymerizable ring-chlorinated styrenes which have a ring-chlorinated styrene content of from 25 to 80% of the weight of the copolymerization product. According to a particular embodiment of the invention, these copolymers are prepared from a mixture containing 35–60% of a ring-chlorinated styrene.

The following examples are illustrative of the present invention, but are not to be considered as limitative thereof. Where parts are given, they are parts by weight.

EXAMPLE I

A mixture of 80 parts 2,5-dichlorostyrene and 20 parts styrene is substantially completely polymerized in a sealed glass container by placing the container and its contents in an oven at a temperature of 40° C. for 2 days, followed by 1 day at 57° C., 3 days at 80° C., 8 hours at 125° C. and 1 day 150° C. The product is clear, hard, tough and substantially colorless.

EXAMPLE II

Example I is repeated, except that a mixture of 75 parts of the chlorostyrene and 25 parts of styrene is used. The product is similar in properties to the product described in Example I.

EXAMPLE III

Example I is repeated, except that a mixture of 75 parts of the chlorostyrene and 25 parts of styrene is used and the heating cycle consists of 12 hours at 60° C., followed by 24 hours at 80° C., 8 hours at 130° C. and 24 hours at 170° C. The product obtained is similar to that described in Example I.

EXAMPLE IV

A mixture of equal parts by weight of 2,5-dichlorostyrene and styrene is substantially completely polymerized by heating under the conditions set forth in Example III to produce a clear, hard, tough and substantially colorless copolymer.

EXAMPLE V

A mixture of equal parts of styrene and chlorostyrene consisting substantially of para-chlorostyrene is substantially completely polymerized as in the previous examples by heating the mixture within a closed glass container in an oven at 100° C. for 7 days, followed by 18 hours at 125° C. and 24 hours at 150° C. The product is a clear, tough, hard and substantially colorless copolymer.

The products described in Examples I–V, inclusive, are found to exhibit unexpected and valuable characteristics typical of the products of the invention. Thus, these products possess an unusually low inflammability, while at the same time they exhibit unusually good molding characteristics, as evidenced by their hardness values, heat distortion temperatures, rates of flow under pressure, etc. Copolymers containing lower proportions of chlorinated styrene have substantially greater inflammability while copolymers having higher proportions of chlorinated styrene do not possess the exceptional molding and other working characteristics of the products of the invention. In addition, the products of the present invention are characterized by unusually good electrical properties as evidenced by their power factors and dielectric constants.

In Table I are set forth comparative data which illustrate the unexpected characteristics of copolymers of styrene with ring-chlorinated styrenes wherein the ring-chlorinated styrene content is from 25–80% of the total copolymer. Copolymers made from a mixture of 65–40 parts of styrene and 35–60 parts of a chlorostyrene possess particular unexpected and valuable properties. For example, the copolymers made from equal parts of styrene and 2,5-dichlorostyrene as illustrated by Example IV in Table I shows a vast lowering of inflammability but an unexpectedly small change in hardness, heat distortion temperature, flow, etc., as compared with polystyrene.

Table I

| Polymeric Material | Heat Distortion Temperature | Hardness | Flow |
|---|---|---|---|
| | °C. | | |
| Polymeric, 2,5-dichlorostyrene | 113 | 103 | None |
| Example I | 97 | | |
| Example III | 94 | 94 | 0.14 |
| Example IV | 80 | 87 | 0.55 |
| Polystyrene | 78 | 85 | 0.75 |
| Example V | | 85 | |
| Poly parachlorostyrene | 108 | 96 | |

In Table I, the heat distortion temperature values are determined by A. S. T. M. method D648–41T. The hardness values are obtained on the "M" scale of the Rockwell hardness tester. The flow values are obtained on the Rossi-Peakes flow tester (A. S. T. M. D569–41T) at 135° C. and 500 pounds per square inch pressure, for a two minute period.

In addition to the copolymers given in the specific examples, copolymers of styrene and ring-chlorinated styrenes generally exhibit properties characteristic of the products of the invention. As examples of polymerizable ring-chlorinated styrenes which may be used in producing the copolymers of the invention may be mentioned: ortho-chlorostyrene, metal-chlorostyrene, para-chlorostyrene, 2,3-dichlorostyrene, 2,4-dichlorostyrene, 2,5-dichlorostyrene, and other polymerizable polychlorostyrenes such as polymerizable tri-, tetra- and pentachlorostyrenes, and mixtures thereof. Especially preferred are copolymers of styrene and mono and dichlorostyrenes and mixtures thereof.

The process of producing the copolymers is not limited as to any particular polymerizing conditions, as for example, any particular temperature, pressure, type or amount of catalyst, or type of polymerization vessel. Generally, it is desirable to carry out the polymerization in at least the initial steps in a closed container to avoid loss of material. Generally, the polymerization conditions used, e. g. time, temperature, catalyst etc. are such as to polymerize substantially all of the monomeric materials, i. e. reduce the methanol-soluble content of the product below 2-3%. Otherwise, it may be necessary to remove unpolymerized material by suitable means e. g. dissolving the product in a solvent, precipitation of the copolymer with a non-solvent and recovery by filtration or by milling on hot rolls, in order to avoid crazing and other defects in products made therefrom.

The copolymers of the invention are adaptable for many uses as is apparent to those skilled in the art. For example, these products may be ground into molding powders, which may then be formed by compression, injection or other molding methods. The solid copolymers may be machined or otherwise formed into articles of desired shapes. The copolymers may be dissolved in suitable solvents such as benzene, toluene, or the like and employed as coating materials, or as materials for impregnating porous articles such as cloth, paper, wood, porous metal castings and the like. When desired, the products of the invention may be mixed with other polymerized or polymerizable materials, fillers, plasticizers, dyes, pigments and the like, by means of hot mixing rolls, Banbury type mixer and the like.

In general, polymerization temperatures within the range 50°-200° C. may be used although generally temperatures of 90°-150° C. are preferred. When it is desired to shorten the time required for the polymerization, such peroxide polymerization catalysts as benzoyl peroxide, acetyl peroxide, lauroyl peroxide, tertiary butyl hydro-peroxide and the like may be used. The polymerization may also be accelerated by exposing the polymerizing mixtures to the action of ultraviolet light with or without the inclusion of peroxide or other catalysts.

The copolymers of the invention produce particularly valuable products for electrical insulation purposes, e. g., molded insulating parts, when mixed with chlorinated diphenyls containing 40-71% chlorine. For example, 30-150 and more particularly 75-125 parts of a chlorinated diphenyl may be mixed with 100 parts of the copolymers to produce highly advantageous compositions. Compositions comprising the copolymers of the invention and a chlorinated diphenyl containing at least 70% chlorine, i. e. 70-71% chlorine, are especially valuable. Thus, a composition comprising substantially equal parts of a chlorinated diphenyl containing about 70% chlorine and a copolymer characterized by being made up of substantially equal parts by weight of styrene and 2,5-dichlorostyrene is exceptionally outstanding with respect to the combination of non-inflammability, ease of molding, high heat distortion temperature and good electrical properties.

Valuable products may also be obtained by admixing chlorinated diphenyl benzenes with the copolymers of the invention in place of chlorinated diphenyls in the proportions given above.

It is to be understood that the description of this invention is illustrative thereof and that variations may be made within the scope of the invention as defined in the appended claims.

What is claimed is:

1. A copolymer made from a mixture comprising 25-80 parts of 2,5-dichlorostyrene for every 75-20 parts of styrene.

2. A product obtained by polymerizing a mixture of equal amounts by weight of 2,5-dichlorostyrene and styrene.

3. A product made by copolymerizing 35-60 parts of 2,5-dichlorostyrene for every 65-40 parts of styrene.

THOMAS S. CARSWELL.
RALPH F. HAYES.

REFERENCES CITED

The following references are of record in the file of this patent:

UNITED STATES PATENTS

| Number | Name | Date |
|---|---|---|
| 2,158,281 | Ford | May 16, 1939 |
| 2,283,539 | Collings | May 19, 1942 |
| 2,321,896 | Britton | June 15, 1943 |
| 2,347,103 | Hayes | Apr. 18, 1944 |
| 2,398,736 | Dreisbach | Apr. 16, 1946 |
| 2,406,319 | Brooks | Aug. 27, 1946 |

FOREIGN PATENTS

| Number | Country | Date |
|---|---|---|
| 564,829 | Great Britain | Oct. 16, 1944 |

OTHER REFERENCES

Marvel et al.: Jamer. Chem. Soc., vol. 65, Nov. 1943, pages 2054-2058.

Ushakox J. App. Chem., U. S. S. R., vol. 17, pages 52-9, 1944 (Chem. Abstr., vol. 39, page 1321, 1945). Only the Chem. Abstr. citation is available in the office.